Patented Mar. 30, 1926.

1,579,086

UNITED STATES PATENT OFFICE.

GEORGE LOUIS COUSINEAU, OF LONG BEACH, CALIFORNIA.

MEDICINAL COMPOSITION.

No Drawing. Application filed December 8, 1924, Serial No. 754,665. Renewed January 28, 1926.

*To all whom it may concern:*

Be it known that I, GEORGE LOUIS COUSINEAU, a citizen of Canada, residing at Long Beach, in the county of Los Angeles and State of California, have invented certain new and useful Improvements in Medicinal Composition, of which the following is a specification.

This invention relates to a new medical material prepared from various glands, and the object of the invention is to prepare such a material in such form that it will be stable and effective, and may be administered hypodermically.

The glands employed are those generally denominated or known as of the endocrine chain or series, such as the parathyroid and thyroid glands which have internal or endocrine secretions, and also the ovarian and testicular glands which have like secretions.

In the preferred form of the process of producing my novel compound, I first remove the glands in question from a young animal, the animal at such time being alive or where thyroid, parathyroid and ovarian glands are utilized, these are extirpated from an animal just after it has been killed. The glands are then minced and ground thoroughly to the form of a pulp, all of the solid particles being reduced to a substantially impalpable state. The gland material thus treated is mixed with a liquid, preferably a physiological salt solution. There is also preferably added alcohol in order to prevent fermentation and other undesired changes, and a small amount of phenolic body is likewise added.

Although the proportions can be varied substantially, I have found that 40 c. c. of the solution should preferably contain approximately 11.56 grams of the gland substance.

To the liquid is then added 10 per cent by volume of alcohol, and about ½% of pure phenol (purified carbolic acid). This produces a liquid having approximately the following composition: Physiological salt solution 1 cubic centimeter, gland substance .289 grams, alcohol (rectified ethyl) 1 cubic centimeter, phenol .005 cubic centimeter.

The liquid is then put up in ampules of different sizes, from 1 c. c. to 40 c. c., or it may be put up in syringes of from 5 c. c. to 40 c. c., or other sizes according to desire.

The liquid made as per the above example can be introduced hypodermically, intramuscularly, or subcutaneously into the human organism, male or female, child or adult. The dose can vary considerably, depending upon the age, vitality, and condition of the patient. The ampules above referred to can be used as single doses, or in some cases substantially greater doses can be given, for example, 55 c. c., 60 c. c., or 80 c. c.

The animals from which the glands are taken should be healthy and in its preferable to use young animals. As examples of animals, the following are mentioned: Monkey, goat, sheep, hog, beef, rabbit. Age of animal: in utero until on and beyond maturity. Shaking of the liquid before using is advisable.

Relative to the substitution of liquids, various types can be used for suspension of the gland; water containing boric acid, salicylic acid, and any type of preservative in normal proportions may be used in the preparation of the glands in the dosages above specified.

The number of diseases or types of diseases in which the glandular substance is of a decided value are so varied that they involve practically every type of disease known.

It is to be noted that under the process above set forth the entire gland is retained, both as to the soluble and insoluble portions thereof, and that the insoluble portions are in effect held in suspension in the liquid.

No claim is made herein specifically to the employment of testicular glands, or a medical product wherein the soluble and insoluble portions of such glands are admixed with an aqueous liquid, as that product forms the subject matter of my copending application filed on or about July 24, 1923, Serial No. 653,576. The present case is designed to cover generically the use of glands of the endocrine chain, and, more specifically, the use of the parathyroid gland.

What I claim is:

1. A new medical product, suitable for hypodermic administration, containing the soluble and insoluble portions of a whole gland of the endocrine chain comminuted to a substantially impalpable condition, admixed with a vehicle comprising a solution of salt of about physiological strength.

2. A new medical product, suitable for hypodermic administration, containing the soluble and insoluble portions of the whole parathyroid gland comminuted to a substantially impalpable condition admixed with a vehicle comprising a solution of salt of about physiological strength.

In testimony whereof I have signed my name to this specification.

GEORGE LOUIS COUSINEAU, M. D.